(12) United States Patent
Ahad

(10) Patent No.: US 7,261,369 B2
(45) Date of Patent: Aug. 28, 2007

(54) CONVERTIBLE AIRCRAFT PASSENGER SEAT

(76) Inventor: Sam J Ahad, 24505 Skyridge Dr., Newhall, CA (US) 91321

( * ) Notice: Subject to any disclaimer, the term of this patent is extended or adjusted under 35 U.S.C. 154(b) by 0 days.

(21) Appl. No.: 10/979,538

(22) Filed: Nov. 2, 2004

(65) Prior Publication Data

US 2006/0091707 A1    May 4, 2006

(51) Int. Cl.
A47B 39/00 (2006.01)

(52) U.S. Cl. .......... 297/148; 297/115; 297/116; 297/411.32; 297/411.35; 297/411.38; 297/162; 297/174 R; 297/160; 297/248; 297/145

(58) Field of Classification Search ........... 297/115, 297/116, 144, 145, 148, 150, 160, 161, 162, 297/170, 171, 172, 174 R, 216.2, 216.16, 297/216.19, 232, 248, 411.32, 411.35, 411.38; 108/44, 42, 25
See application file for complete search history.

(56) References Cited

U.S. PATENT DOCUMENTS

| | | | | |
|---|---|---|---|---|
| 2,604,930 A * | 7/1952 | Dean et al. | .......... | 297/170 |
| 3,102,754 A * | 9/1963 | Junkunc | .......... | 297/162 |
| 3,145,052 A | 8/1964 | Morgan | .......... | 297/354 |
| 3,392,954 A * | 7/1968 | Malitte | .......... | 248/429 |
| 3,580,630 A * | 5/1971 | Fetter | .......... | 297/125 |
| 3,583,760 A * | 6/1971 | McGregor | .......... | 297/145 |
| 3,730,019 A | 5/1973 | Ballard | .......... | 74/502 |
| 4,354,398 A | 10/1982 | Porter | .......... | 74/501 |
| 4,526,421 A * | 7/1985 | Brennan et al. | .......... | 297/232 |
| 4,634,182 A | 1/1987 | Tanaka | .......... | 297/379 |
| 4,662,676 A * | 5/1987 | Havelock | .......... | 297/160 |
| 4,887,864 A | 12/1989 | Ashton | .......... | 297/375 |
| 4,944,552 A * | 7/1990 | Harris | .......... | 297/145 |
| 5,000,511 A * | 3/1991 | Shichijo et al. | .......... | 297/188.05 |
| 5,029,822 A | 7/1991 | Selzer | .......... | 267/64.12 |
| 5,037,157 A * | 8/1991 | Wain et al. | .......... | 297/188.18 |
| 5,058,829 A | 10/1991 | Bentley | .......... | 244/122 |
| 5,177,616 A * | 1/1993 | Riday | .......... | 348/837 |
| D333,420 S | 2/1993 | Bales et al. | .......... | D8/349 |
| 5,281,001 A * | 1/1994 | Bergsten et al. | .......... | 297/411.24 |
| 5,316,369 A * | 5/1994 | Kanda | .......... | 297/188.15 |
| 5,374,104 A * | 12/1994 | Moore et al. | .......... | 297/188.16 |
| 5,449,132 A | 9/1995 | Gilbert | .......... | 244/122 |
| 5,451,092 A * | 9/1995 | Gray | .......... | 297/122 |
| 5,558,391 A * | 9/1996 | Chavous | .......... | 297/153 |
| 5,612,718 A * | 3/1997 | Bryan | .......... | 345/168 |
| 5,651,587 A | 7/1997 | Kodaverdian | .......... | 297/423.36 |
| 5,722,722 A * | 3/1998 | Massara | .......... | 297/216.13 |
| 5,762,296 A | 6/1998 | Gilbert | .......... | 244/118.1 |
| 5,765,911 A * | 6/1998 | Sorenson | .......... | 297/173 |
| 5,794,470 A | 8/1998 | Stringer | .......... | 70/261 |
| 5,806,932 A | 9/1998 | Zhuang | .......... | 297/361.1 |
| 5,871,259 A | 2/1999 | Gehart | .......... | 297/361.12 |
| 5,871,318 A | 2/1999 | Dixon et al. | .......... | 410/105 |
| 5,887,949 A | 3/1999 | Kodaverdian | .......... | 297/423.36 |
| 5,890,765 A * | 4/1999 | LaPointe et al. | .......... | 297/354.13 |
| 6,003,394 A | 12/1999 | Heckel, Jr. | .......... | 74/89.15 |
| 6,019,429 A | 2/2000 | Tedesco | .......... | 297/328 |

(Continued)

Primary Examiner—David Dunn
Assistant Examiner—Erika Garrett

(57) ABSTRACT

An aircraft passenger convenience apparatus comprising: a seat assembly; a support device attached to the seat assembly; and a platform having a top and bottom, the platform at least partially supported by the support device. In the preferred embodiment, the support device is selectable between at least a tray support and an armrest position. Also in the preferred embodiment, the seat assembly includes a seat back.

30 Claims, 3 Drawing Sheets

U.S. PATENT DOCUMENTS

| | | |
|---|---|---|
| 6,086,155 A | 7/2000 | Stiffler .................. 297/362 |
| 6,106,067 A | 8/2000 | Zhuang et al. ............ 297/361.1 |
| 6,279,416 B1 | 8/2001 | Bucholtz et al. ........... 74/501.5 |
| 6,547,323 B1 * | 4/2003 | Aitken et al. ............... 297/113 |
| 6,619,747 B2 * | 9/2003 | Ko et al. ................ 297/423.12 |
| 6,669,295 B2 | 12/2003 | Williamson ............ 297/362.13 |
| 6,793,282 B2 * | 9/2004 | Plant et al. ................. 297/248 |
| 6,799,805 B2 * | 10/2004 | Johnson ................... 297/452.2 |
| 6,863,344 B2 * | 3/2005 | Smallhorn ............... 297/217.3 |
| 2004/0145225 A1 | 7/2004 | Alter .......................... 297/367 |

* cited by examiner

CONVERTIBLE AIRCRAFT PASSENGER SEAT

BACKGROUND OF THE INVENTION (1) Field of the Invention

The present invention relates generally to an aircraft passenger convenience apparatus and, more particularly, to a platform apparatus for an aircraft passenger convenience assembly.

(2) Description of the Prior Art

Many commercial airlines feature triple economy class seats that can be converted to double business class seats by installing a cocktail tray over the center position. Traditional convertible seat designs feature mechanisms for stowing and deploying the cocktail tray assembly that required the tray to be stored in the seat back, or overhead compartment, and for the center armrests to be removed or completely dislocated.

Traditional designs prevent the center armrests from being as fully functional as they would be on a non-convertible seat assembly, and stowage of the cocktail tray either interferes with passenger comfort, or takes up valuable space in the overhead compartment. In addition, these mechanisms often add considerably to the complication of the design and the weight of the seat assembly, resulting in increased cost, decreased reliability and increased fuel consumption. Thus, there remains a need for a new and improved lightweight convertible seat assembly, with fully pivoting center armrests, that don't require complex mechanisms to shift, and won't compromise the comfort of the middle seat position.

SUMMARY OF THE INVENTION

The present invention is directed to an aircraft passenger convenience apparatus comprising: a seat assembly; a support device attached to the seat assembly; and a platform having a top and bottom, the platform at least partially supported by the support device. In the preferred embodiment, the support device is selectable between at least a tray support and an armrest position. Also in the preferred embodiment, the seat assembly includes a seat back.

In the preferred embodiment, the support device may be an armrest. The apparatus may further include a pivot point in the support device about which an end of the support device selectively pivots. The apparatus may further include a latch connected to the support device for securing the support device in a selected position. The apparatus may further include a cup holder in the platform. The apparatus may further include a bracket affixed to the bottom of the platform for securing the platform to the support device. The apparatus may further include a recess in the bottom of the platform for securing the platform to the support device. The apparatus may further include a front cover attached to the platform.

In the preferred embodiment, the seat assembly may further include a headrest. The seat assembly may further include a platform storage compartment holder for storing the platform. The seat assembly may further include seat control device. The seat control device may further include a seat recline control. The seat assembly may further include a baggage bar. The seat assembly may further include a seat belt.

Accordingly, one aspect of the present invention is to provide an aircraft passenger convenience apparatus comprising: a seat assembly; a support device attached to the seat assembly; and a platform at least partially supported by the support device.

Another aspect of the present invention is to provide a platform apparatus for an aircraft passenger convenience assembly, the platform apparatus comprising: a support device selectable between at least a tray support and an armrest position; and a platform having a top and bottom, the platform at least partially supported by the support device.

Still another aspect of the present invention is to provide an aircraft passenger convenience apparatus comprising: a seat assembly having a seat back; a support device selectable between at least a tray support and an armrest position, the support device attached to the seat assembly; and a platform having a top and bottom, the platform at least partially supported by the support device.

These and other aspects of the present invention will become apparent to those skilled in the art after a reading of the following description of the preferred embodiment when considered with the drawings.

DESCRIPTION OF THE PREFERRED EMBODIMENTS

Figure 1:
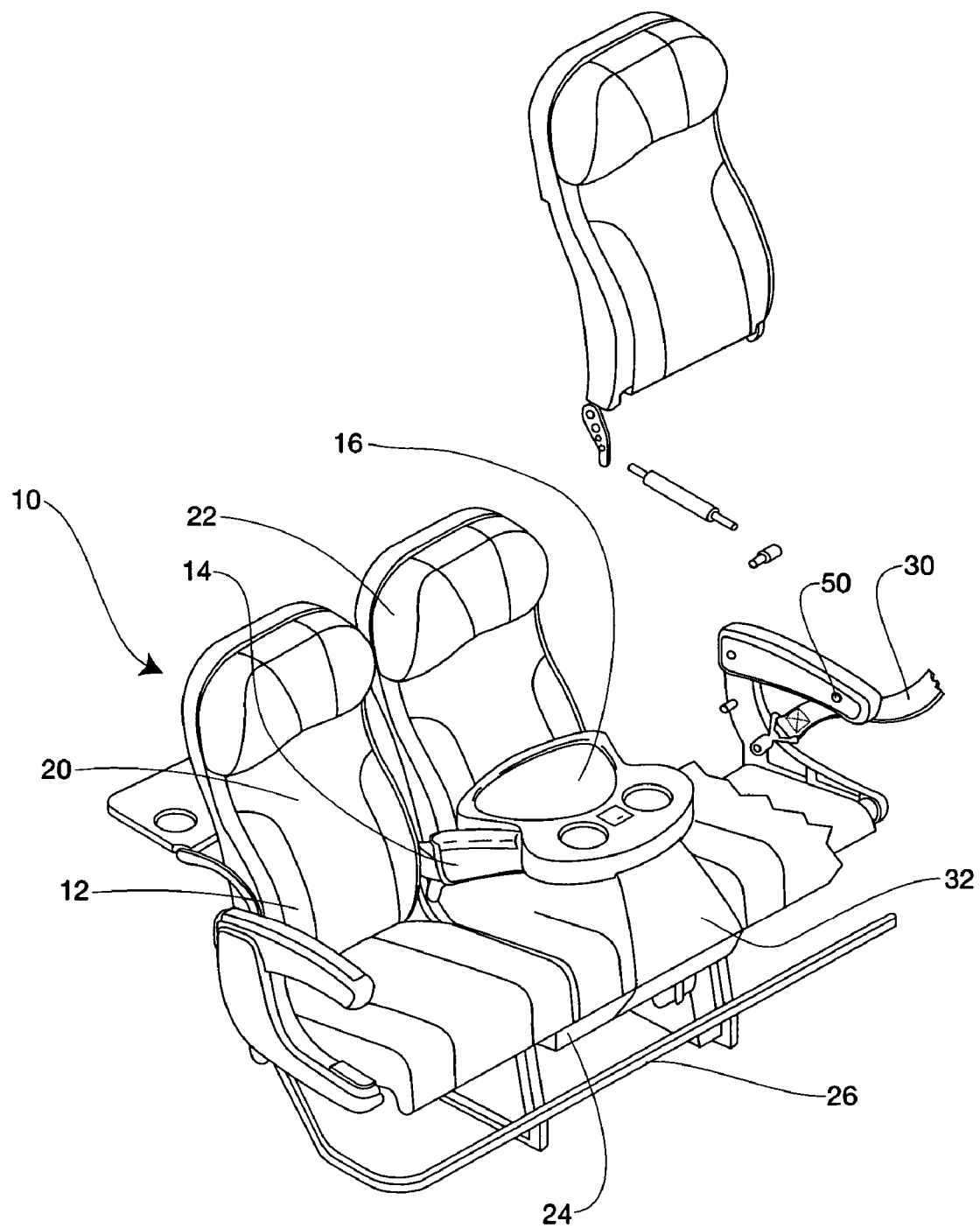
FIG. 1 is a perspective view of an aircraft passenger convenience apparatus constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, the illustrations are for the purpose of describing a preferred embodiment of the invention and are not intended to limit the invention thereto. As best seen in FIG. 1, an aircraft passenger convenience apparatus, generally designated 10, is shown constructed according to the present invention. The aircraft passenger convenience apparatus 10 includes a seat assembly 12 located between a pair of passenger seats on opposing sides of the central seat assembly 12, a support device 14 attached to the seat assembly 12, and a platform 16 at least partially supported by the support device 14. The seat assembly 12 includes a seat back 20, a headrest 22, a platform storage compartment 24 for storing the platform, a baggage bar 26, a seat belt 30, and a seat control device 50. The seat control device 50 is a seat recline control. FIG. 1 also shows the platform apparatus 16 including a front cover 32 attached to a platform 40 at one end and the seat frame at the other end. The apparatus 16 includes a platform 40 at least partially supported by the support device 14. The center seat of the seat assembly includes a center position seat belt substantially identical to and similar in relative location to the seat belt 30 shown in FIG. 1. This additional seat belt is used to secure the platform 16 into place on the support device 14.

Figure 2:
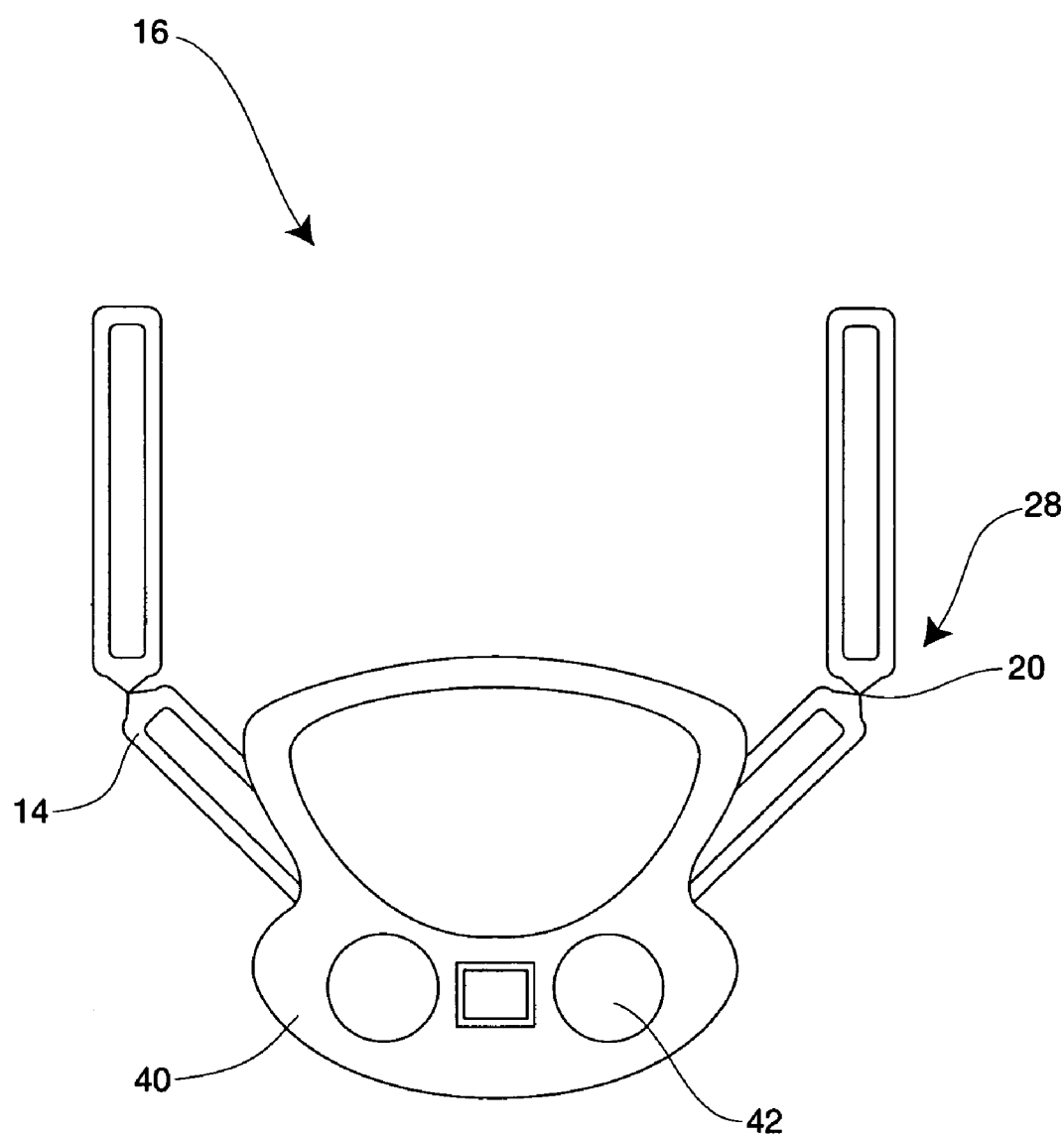
FIG. 2 is a top view of a platform apparatus for an aircraft passenger convenience assembly.

FIG. 2 is a top view of a platform 40 for a platform apparatus 16 for an aircraft passenger convenience assembly. The platform apparatus 16 includes a support device 14 selectable between at least a tray support and an armrest position. The support device 14 comprises a pair of armrests on opposing sides of the central seat assembly 12 and each of the pair of armrests includes a pivot point 20 about which an end of the support device selectively pivots. The support device 14 includes a discrete latch 28 connected to the support device 14 for securing the support device 14 into a selected position. The support device 14 is shown in the tray support position. From the armrest position, the platform 40 is removed and the support device 14 can pivot upward as a conventional armrest. Thus an additional seat having armrests is available on the aircraft after the platform 40 is removed. The platform 40 includes a cup holder 42 in the top of the platform 40.

Figure 3:
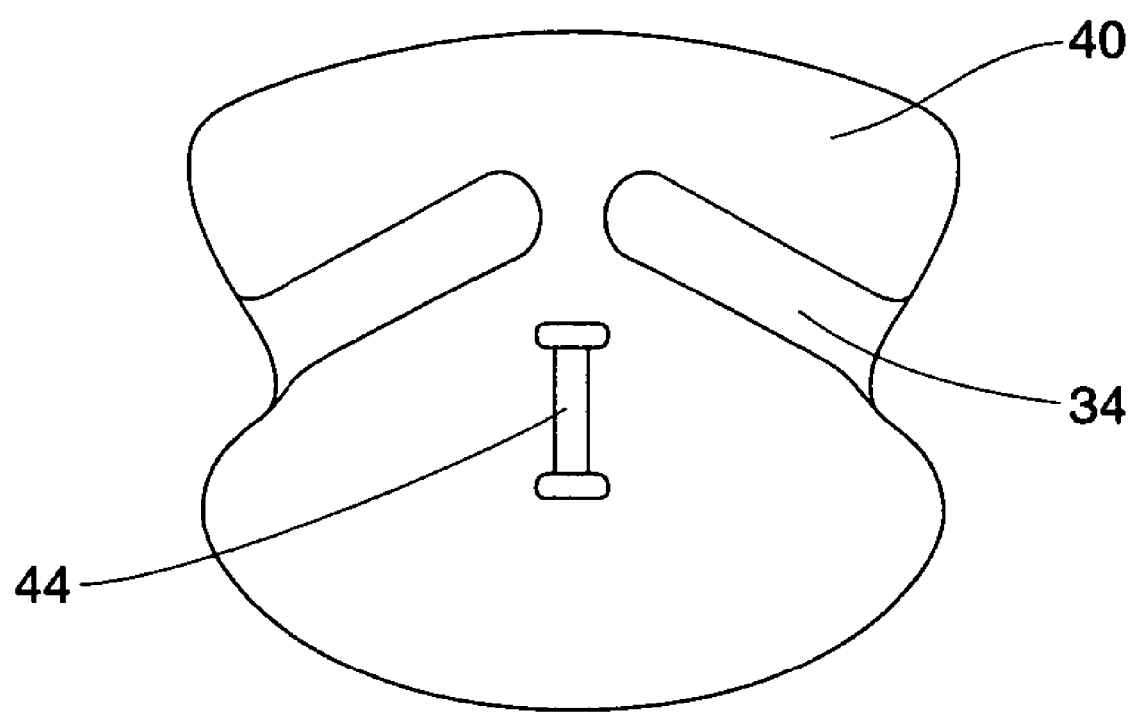
FIG. 3 is a bottom view of a platform for an aircraft passenger assembly.

FIG. 3 is a bottom view of the platform 40 showing a bracket affixed 44 to the bottom of the platform for securing the platform to the platform support device with the seat belt 30, and a recess 34 in the bottom of the platform for securing the platform 40 to the platform support device.

Certain modifications and improvements will occur to those skilled in the art upon a reading of the foregoing description. By way of example, the latch 28 may be activated remotely via cable links. The latch can be located at any reachable area on the seat frame. Also, the platform 40 can be separated from the seat assembly and stowed away remotely from the seats, or integrated with the center back assembly. The platform can be eliminated completely. All such modifications and improvements have been deleted herein for the sake of conciseness and readability but are properly within the scope of the following claims.

We claim:

1. An aircraft passenger convenience apparatus comprising:
    (a) a seat assembly including a pair of passenger seats on opposing sides of a central seat and a seat back and a platform storage compartment coupled to a bottom of at least one of the seats;
    (b) a support device comprising pair of armrests pivotably coupled to opposite sides of the seat back of the central seat and each armrest having an upper, generally elongated, arm support portion, including a stationary portion and pivotable portion, the ends of the arm support portions of the armrests are inwardly pivotable to form a generally v-shaped horizontal support; and
    (c) a platform positionable on the pair of armrests when the ends of the armrests are inwardly pivoted and removable therefrom for stowage in the compartment when the ends of the armrests are not inwardly pivoted.

2. The apparatus according to claim 1, wherein the seat assembly further includes a seat back connected to each of the pair of seats on the opposing sides of the central seat.

3. The apparatus according to claim 2, wherein the seat assembly further includes a headrest attached to said seatback.

4. The apparatus according to claim 1, wherein the platform includes bracket for securing the platform to the support device with a seat belt.

5. The apparatus according to claim 4, wherein the seat assembly further includes a seat belt.

6. The apparatus according to claim 1, wherein the seat assembly further includes a seat control device.

7. The apparatus according to claim 6, wherein the seat control device further includes a seat recline control.

8. The apparatus according to claim 1, wherein the seat assembly further includes a baggage bar.

9. A platform apparatus for an aircraft having a seat assembly including a pair of passenger seats on opposing sides of a central seat and a seat back, the platform apparatus comprising:
    (a) a support device including a pair of pivotable armrests and each armrest having an upper, generally elongated, arm support portion, including a stationary portion and pivotable portion, one of the pair on each opposing side of the central seat and each of the pair having a portion of the ends of the arm support portions of the armrests inwardly movable between at least a tray support position to form a generally v-shaped horizontal support and an armrest position, each of the armrests also upwardly pivotable at an end including the movable portion; and
    (b) a platform having a top and bottom, the platform at least partially supported by the support device.

10. The apparatus according to claim 9 further including a pivot point in the support device about which the movable portion of the support device selectively pivots.

11. The apparatus according to claim 9 further including a latch connected to the support device for securing the movable portion of the support device in a selected position.

12. The apparatus according to claim 9, further including a cup holder in the platform.

13. The apparatus according to claim 9, further including a bracket affixed to the bottom of the platform for securing the platform to the support device.

14. The apparatus according to claim 9, further including a recess in the bottom of the platform for securing the platform to the support device.

15. The apparatus according to claim 9, further including a front cover attached to the platform.

16. An aircraft passenger convenience apparatus comprising:
    (a) a seat assembly having a seat and a seat back;
    (b) a support device including a pair of opposing pivotable armrests and each armrest having an upper, generally elongated, arm support portion, including a stationary portion and pivotable portion, each of the pair coupled to the seat back and having a portion of the ends of the arm support portions of the armrests inwardly movable from an armrest position toward a center of the seat back to a tray support position to form a generally v-shaped horizontal support and each armrest also upwardly pivotable at the one end about an axis at the opposite end; and
    (c) a platform on the support device and removable there from for storage in a compartment configured to receive the platform under the seat.

17. The apparatus according to claim 16, wherein the seat assembly further includes a headrest.

18. The apparatus according to claim 16, platform storage compartment includes a plurality of walls extending from a bottom of the seat to a substantially horizontal bottom for suspending the platform above an aircraft deck.

19. The apparatus according to claim 16, wherein the seat assembly further includes a seat control device.

20. The apparatus according to claim 19, wherein the seat control device further includes a seat recline control.

21. The apparatus according to claim 16, wherein the seat assembly further includes a baggage bar.

22. The apparatus according to claim 16, wherein the seat assembly further includes a seat belt.

23. The apparatus according to claim 16, wherein the support device is an armrest.

24. The apparatus according to claim 16 further including a pivot point in the support device about which the movable portion of the support device selectively pivots.

25. The apparatus according to claim 16 further including a latch connected to the support device for securing the movable portion of the support device in a selected position.

26. The apparatus according to claim 16, further including a cup holder in the platform.

27. The apparatus according to claim 16, further including a bracket affixed to the bottom of the platform for securing the platform to the support device.

28. The apparatus according to claim 16, further including a recess in the bottom of the platform for securing the platform to the support device.

29. The apparatus according to claim 16, further including a front cover attached to the platform.

30. An aircraft passenger convenience apparatus comprising:
   (a) a seat assembly including a plurality of passenger seats, each seat corresponding to a seat back and a seat belt;
   (b) a pair of armrests on opposite sides of a central one of the seats, each armrest having an upper, generally elongated, arm support portion, including a stationary portion and pivotable portion, having a portion of the ends of the arm support portions of the armrests inwardly pivotable about an axis from an armrest to a tray support position to form a generally v-shaped horizontal support and also the end upwardly pivotable about another axis toward the seat back corresponding to the central one of the seats;
   (c) a storage compartment below the central one of the seats comprising an opening for receiving a serving tray and a bottom wall for supporting the tray above an aircraft deck; and
   (d) a serving tray having a bracket for securing the tray with one or more of the seat belts on the armrests with the inwardly pivotable end in the tray support position.

* * * * *

UNITED STATES PATENT AND TRADEMARK OFFICE
CERTIFICATE OF CORRECTION

PATENT NO.        : 7,261,369 B2
APPLICATION NO. : 10/979538
DATED             : August 28, 2007
INVENTOR(S)       : Sam J. Ahad It is certified that error appears in the above-identified patent and that said Letters Patent is hereby corrected as shown below:

On the Title page, Item (73) the assignee should be Timco Aviation Services, Inc.

Figure 2, call number 20 should be 18

Column 4, Line 5, call number 20 should be 18

Signed and Sealed this

Twenty-fourth Day of February, 2009

JOHN DOLL
*Acting Director of the United States Patent and Trademark Office*